United States Patent [19]

Lingemann

[11] Patent Number: 4,994,918
[45] Date of Patent: Feb. 19, 1991

[54] METHOD AND CIRCUIT FOR THE AUTOMATIC CORRECTION OF ERRORS IN IMAGE STEADINESS DURING FILM SCANNING

[75] Inventor: Karl-Heinz Lingemann, Pfungstadt, Fed. Rep. of Germany

[73] Assignee: BTS Broadcast Television Systems GmbH, Darmstadt, Fed. Rep. of Germany

[21] Appl. No.: 514,679

[22] Filed: Apr. 25, 1990

[30] Foreign Application Priority Data

Apr. 28, 1989 [DE] Fed. Rep. of Germany ....... 3914076

[51] Int. Cl.$^5$ ............................................ H04N 5/253
[52] U.S. Cl. .................................... 358/214; 358/222
[58] Field of Search .............. 358/214, 215, 216, 222, 358/54, 209

[56] References Cited

U.S. PATENT DOCUMENTS

| 4,513,324 | 4/1985 | Poetsch et al. ...................... 358/54 |
| 4,630,120 | 12/1986 | Childs ................................. 358/214 |
| 4,717,958 | 1/1988 | Gal et al. ............................ 358/222 |
| 4,814,885 | 3/1989 | Beard ................................. 358/214 |
| 4,875,102 | 10/1989 | Poetsch ............................. 358/214 |
| 4,903,131 | 2/1990 | Lingemann et al. ................ 358/214 |

FOREIGN PATENT DOCUMENTS

| 2187913 | 9/1987 | United Kingdom . |
| 2190518 | 11/1987 | United Kingdom . |
| 8905554 | 6/1989 | United Kingdom . |

Primary Examiner—Howard W. Britton
Assistant Examiner—Tuan V. Ho
Attorney, Agent, or Firm—Felfe & Lynch

[57] ABSTRACT

A method and a circuit for the detection and the automatic correction of horizontal and vertical errors in image steadiness during the television film scanning of continuously moving motion picture films wherein different frame start pulses are generated and substituted for pulses normally derived during the television scanning of the sprocket holes in case of failure or wrong position of the pulses due to impurities or damage of the sprocket holes.

8 Claims, 2 Drawing Sheets

METHOD AND CIRCUIT FOR THE AUTOMATIC CORRECTION OF ERRORS IN IMAGE STEADINESS DURING FILM SCANNING

BACKGROUND OF THE INVENTION

The invention relates to a method for determining and automatically correcting horizontal and vertical errors in image steadiness during television image scanning of continuously moving motion picture film having a succession of image frames. More particularly, the invention relates to a method of the type disclosed in U.S. Pat. No. 4,903,131, which issued on Feb. 20, 1990. The disclosure of that patent is incorporated herein by reference.

U.S. Pat. No. 4,903,131 discloses a method in which video signals produced during image scanning are temporarily stored in an image buffer memory. Vertical image steadiness error signals are used to determine the start of scanning of the first television scan line for each film frame, as well as the start of writing the video signals for the film frame into memory, in dependence upon the vertical position of a film frame relative to the television image scanner. Standard television horizontal and vertical timing pulses are produced in synchronism with studio timing pulses, and video signals are read out of the memory in dependence upon the standard pulse.

Frame start pulses produced from the vertical error signals are released only during a portion of the scanning period, and are blocked during the remainder of the period. The blocking and releasing in each scanning period are determined by a tachometer roll such as a sprocket which engages perforations in the film without slippage. Substitute pulses derived from the tachometer are automatically provided during the release period if frame start pulses are missing.

U.S. Pat. No. 4,903,131 describes the recovery of image frame start pulses and horizontal position values for correcting vertical and horizontal errors in image steadiness. It does not provide a detailed discussion of how vertical and horizontal correction values, respectively, are supplied in case of failure or incorrect position of the frame start pulses and the horizontal position values, respectively.

SUMMARY OF THE INVENTION

It is hence an object of the invention to further develop the method disclosed in U.S. Pat. No. 4,903,131 such that exact vertical correction values can always be favorably formed even in case of failure or too large a storage of the frame start pulses, which could be caused by contaminated or damaged sprocket holes.

According to the invention, first window pulses are derived from the pulse signal of the tachometer roll and from the frame start pulses. Second window pulses are derived from the pulse signal of the tachometer roll. The release portion of each scanning period is determined by the first window pulse. When frame start pulses are missing during the release portion, the substitute pulses are generated by the second window pulses.

DETAILED DESCRIPTION OF THE PREFERRED EMBODIMENT

Figure 1:
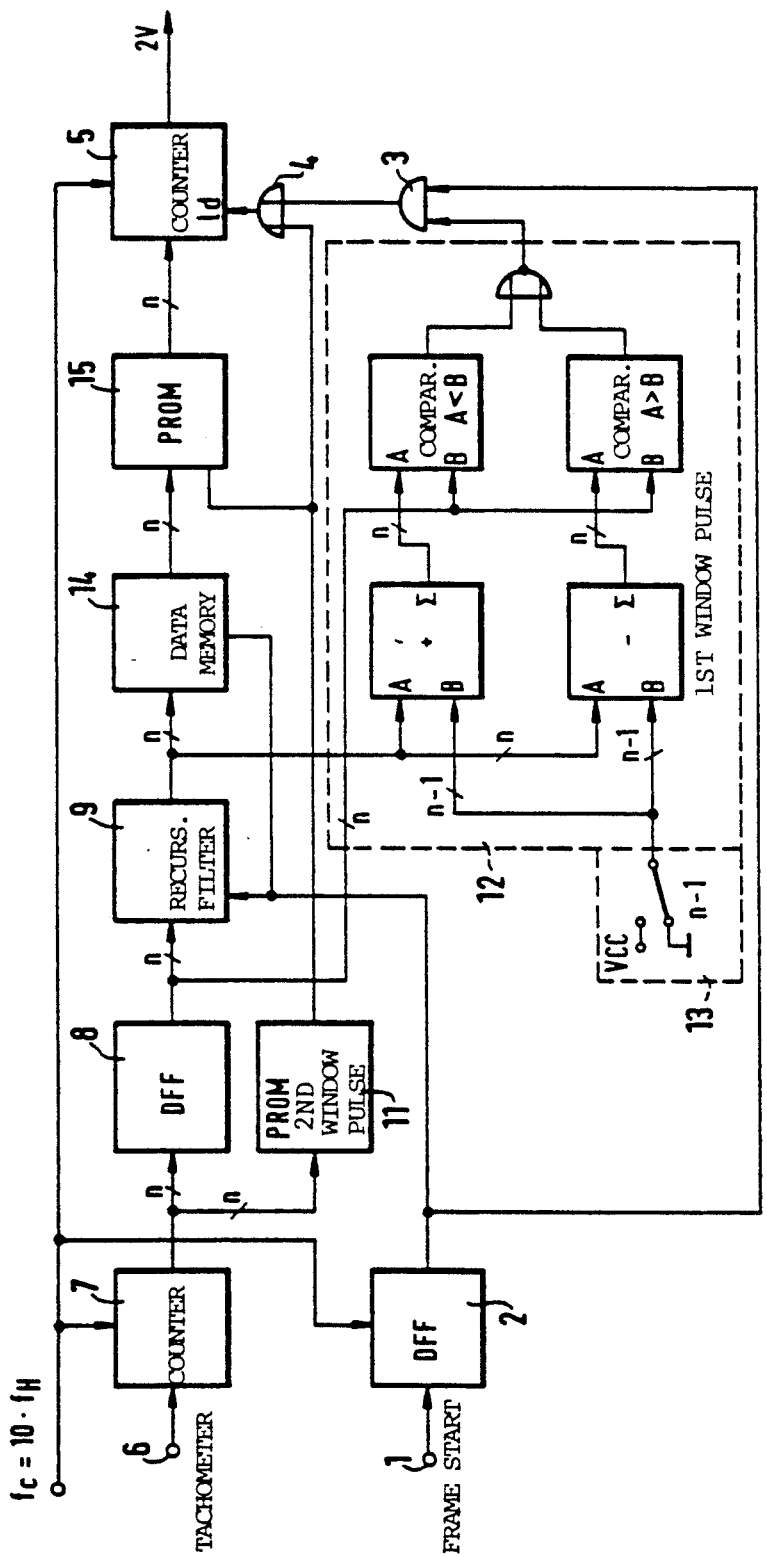
FIG. 1 is a block diagram for producing the vertical correction values.

In the block diagram of FIG. 1, the frame start pulses which are generated during the scanning of the sprocket holes are available at terminal 1. These frame start pulses are generated by a processing circuit such as the circuit 10 depicted in FIG. 1 of U.S. Pat. No. 4,903,131. Via a D-register 2, these frame start pulses are supplied to the first input of an AND-gate 3 which allows the pulses to pass if the first window pulses, which are supplied to the second input, are available. The output of the AND-gate 3 is connected to the input of an OR-gate 4 and second window pulses are supplied to the other input thereof. A frame start pulse which is available within the first and second window pulses is hence directly supplied to the loading input of a first counter 5 which is connected to the output of the OR-gate. A start/pulse signal which is delayed by an invariably prescribed time is then supplied to the data input of this counter 5. The respective 2V-pulse can then be taken up at the output of the counter 5.

Via terminal 6, a pulse signal derived from the tachometer roll is supplied as a second input signal. This signal is available at the input of a second counter 7. The output thereof is, on the one hand, via a D-register 8 connected to a recursive filter 9 and, on the other hand, to the input of a programmable memory (PROM) 11. The programmable memory 11 serves to generate the second window pulses which are derived from the tachometer roll pulses and supplied to the second input of the OR-gate 4. With its input and its output, the recursive filter 9 is directly connected to the two inputs of a circuit 12 for generating the first window pulses. The width of these window pulses can be changed by adjusting the front or the rear edge of the pulse by means of switch 13. The output of the circuit 12 is connected to the second input of the AND-gate. The output of the recursive filter 9 is also connected to the input of a data memory 14 where the respectively actualized value of the tachometer roll pulse is stored with respect to the frame start pulse. This stored value is now supplied to another programmable memory 15 which triggers an invariably prescribed delay of the frame start pulse and the tachometer roll, respectively, such that the 2V pulses which are supplied to the data input of the counter 5 and picked up at its output are placed in the same distance to the rear edge of the second window pulses as are the undisturbed frame start pulses.

Figure 2:
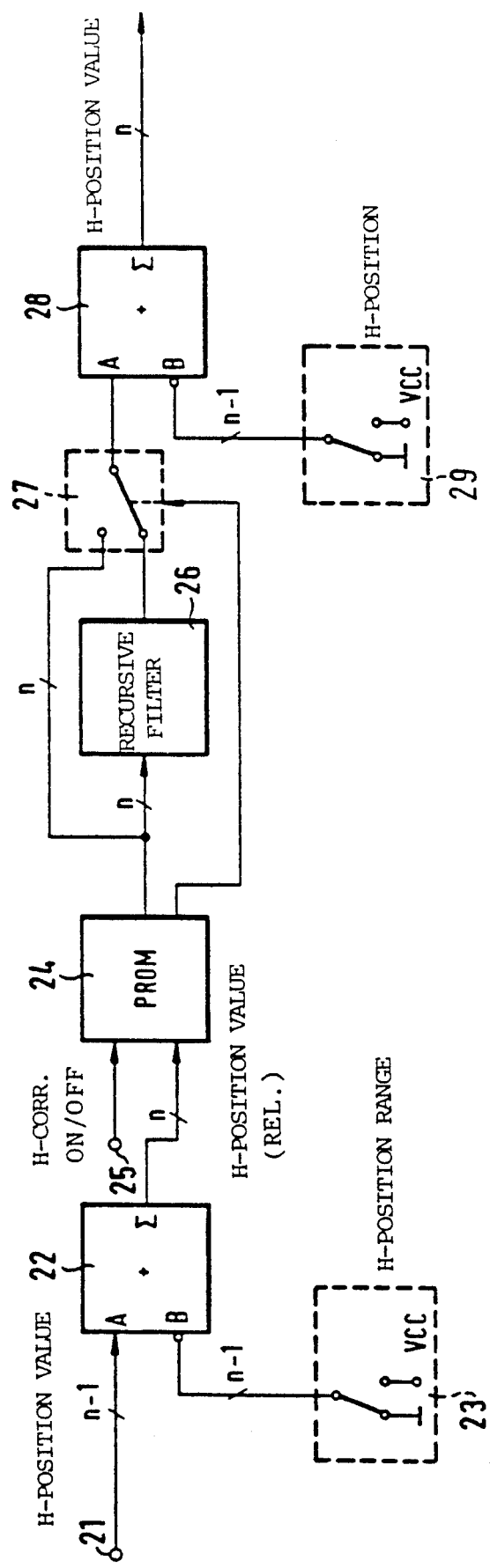
FIG. 2 is a block diagram for producing the horizontal correction values.

The block diagram according to FIG. 2 is used for horizontal position (H-position) adjustment as in block 17 in FIG. 1 of U.S. Pat. No. 4,903,131. In this case, the horizontal position value (which is supplied by the processing circuit 10 in FIG. 1 of U.S. Pat. No. 4,903,131) is supplied to the positive input of a subtraction stage 22, to the negative input of which a value is supplied which can be adjusted with switch 23. The relative H-position value can be picked up at the output of stage 22 and be supplied to a programmable memory (PROM) 24. A further input 25 is used to switch this memory 24 to a fixed output value and the H-correction can thus be then switched off. The output of this memory 24 is connected to the one input via another recursive filter 26, on the one hand, and, on the other hand, it is directly connected to the other input of a changeover switch 27. The latter is controlled by a signal of yet another output of memory 24. Depending on whether the H-position values are in the range selected, signals are supplied to this switch either directly or, when the H-position values are outside this range via the values averaged in the recursive filter 26. The output of the switch 27 is then connected to the positive input of a further subtraction circuit 28 to the negative input of which an adjustable value for the H-position supplied which can be adjusted by switch 29. The corrected H-position value can then be picked up at the output of the subtraction circuit 28.

What is claimed is:

1. Method for the detection and automatic correction of horizontal and vertical errors in image steadiness during the image scanning of continuously moving motion picture films using image memories, comprising
    producing horizontal and vertical image steadiness error signals, said vertical image steadiness error signals being produced in dependence upon the vertical position of a film frame relative to the television image scanner;
    determining from said vertical image steadiness error signals the start of the scanning of the first television scan line of a new film frame and, simultaneously, the start of writing video signals in at least one image memory;
    producing standard horizontal and vertical studio timing pulses;
    selecting video signals from at least one image memory in synchronism with the studio timing pulses;
    producing horizontal position values from the horizontal error signals and producing frame start pulses from the vertical error signals;
    releasing the frame start pulse only during a portion of the scanning period and blocking said pulse during the remainder of this scanning period;
    determining the blocking and releasing in each scanning period by a tachometer roll which engages the perforations of the film without slippage;
    automatically providing substitute pulses derived from the tachometer during the release period in case frame start pulses are missing;
    deriving first window pulses from the pulse signal of the tachometer roll and from the frame start pulses;
    deriving second window pulses from the pulse signal of the tachometer roll;
    determining the release portion of each scanning period by the first window pulse; and
    generating substitute pulses by the second window pulses in case frame start pulses are missing during the release portion.

2. Method in accordance with claim 1, wherein the first window pulses are generated by comparing the respective actual value of the tachometer pulse signal to a value averaged from several preceding values.

3. Method in accordance with claim 2, wherein the width of the first window pulse is adjusted by shifting the front and/or rear edge.

4. Method in accordance with claim 1, wherein the second window pulse is generated by the respective actual value of the tachometer pulse signal and the substitute pulses are derived from the averaged value of several preceding frame start pulses and supplied when frame start pulses are missing during the release portion of the second window pulses.

5. Method in accordance with claim 1, wherein the horizontal position value for the horizontal position adjustment is delayed by a selectable value, and when an actual horizontal position value is missing a value is produced which is averaged from several preceding values.

6. Method in accordance with claim 5, wherein the range of the horizontal position adjustment can be selected.

7. Circuit for the detection and automatic correction of horizontal and vertical errors in image steadiness during image scanning of continuously moving motion picture film having a succession of image frames, comprising
    means for generating tachometer pulses;
    means for generating frame start pulses;
    a first D-register connected to the output of said means for generating said frame start pulses;
    a circuit for generating first window pulses;
    a circuit for generating second window pulses;
    an AND-gate having a first input where frame start pulses are available via said first D-register and a second input connected to the output of the circuit for generating the first window pulses;
    an OR-gate having a first input connected to the output of the AND-gate and a second input connected to the output of the circuit for generating the second window pulses;
    a first counter having a loading input connected to the output of the OR-gate, a data input, and an output where substitute frame start pulses are available when actual frame start pulses are not available;
    a second counter having an input where tachometer pulses are supplied and an output connected to the input of the circuit for generating the second window pulses;
    a second D-register which is also connected to the output of the second counter;
    a recursive filter having an input connected to the output of the second D-register and to an input of the circuit for generating the first window pulses, said recursive filter having an output which is also connected to an input of the circuit for generating the first window pulses;
    a data memory having an input connected to the output of said recursive filter; and
    a delaying circuit having an input connected to the output of the data memory and an output connected to the data input of the first counter.

8. Circuit for the detection and automatic correction of horizontal and vertical errors in image steadiness during image scanning of continuously moving motion picture film having a succession of image frames, comprising
    means for generating horizontal position values,
    first and second means for generating an adjustable value for adjusting the horizontal position range;
    a first subtraction circuit having a positive input to which the horizontal position values are supplied and a negative input connected to the output of the first means for generating an adjustable value;
    a programmable memory having an input connected to the output of the first subtraction circuit;
    a recursive filter having an input connected to the output of the programmable memory;
    a changeover switch having an input connected to the output of the recursive filter and an input connected directly to the output of the programmable memory;
    a second subtraction circuit having a positive input connected to the output of the changeover switch, a negative input connected to the output of the second means for generating an adjustable value, and an output where substitute horizontal position values are available when actual horizontal position values are missing.

* * * * *